2,966,440
Patented Dec. 27, 1960

2,966,440
INSECTICIDAL COMPOSITIONS

Philip Gerolt, Herne Bay, England, assignor to Shell Oil Company, a corporation of Delaware No Drawing. Filed May 6, 1957, Ser. No. 657,063

Claims priority, application Great Britain May 7, 1956

2 Claims. (Cl. 167—42)

This invention relates to insecticidal compositions for use on sorptive surfaces and more specifically to halogenated polycyclic insecticides such as aldrin, dieldrin, isodrin and endrin which manifest extended residual toxicity when admixed with resins.

In the past insecticidal mixtures have been sprayed or otherwise deposited on surfaces possessing sorptive properties. It has been found however, that these mixtures soon lose their insecticidal potency. This is particularly true when the insecticide is deposited on plant foliage, paper, soil, mud, bricks, concrete and plaster. This deactivation of insecticidal compositions is particularly acute in hot, dry, tropical and sub-tropical areas where, for example, the interior mud walls of native houses are treated with residual insecticidal sprays in a campaign to eliminate disease-carrying insects. In spite of intensive research on this problem in the past, a satisfactory insecticidal composition showing extended residual insecticidal activity when applied to sorptive surfaces has not been found.

It is, consequently, the principal object of the present invention to provide insecticidal compositions which will manifest extended residual activity when placed on sorptive surfaces.

Another object of the present invention is to provide insecticidal compositions which manifest extended residual activity but may be easily and economically formulated.

Yet another object of the present invention is to provide a method of eradicating insects comprising the step of exposing the insects to sorptive surfaces impregnated with these insecticidal compositions.

Other objects, features and advantages of the present invention will be apparent from the following description read in conjunction with the appended claims.

It has been established that the deactivation of insecticidal spray residues is not due to decomposition of the toxic ingredient but to its migration from the surface to the interior of the treated surface where its contact insecticidal action can no longer be exercised. The residues of both volatile and non-volatile insecticides lose their activity in this way. The cause of this migration is not yet known, but appears to be connected with some power of the sorptive material to attract the molecules of the insecticidal substance. This diminution of insecticidal potency by migration is not to be confused with diminution due to evaporation of insecticides of relatively high vapor pressure. The difference between these two phenomena will be immediately obvious to those well versed in the art.

Of recent years, halogenated polycyclic insecticides such as aldrin, isodrin, dieldrin and endrin have been increasingly used as the active ingredient in insecticidal sprays. Aldrin is the name of a product consisting essentially of 1,2,3,4,10,10-hexachloro-1,4,4a,5,8,8a-hexahydro-1,4,5,8-endo-exo-dimethanonaphthalene. Isodrin is the name of a product consisting essentially of the stereoisomer of aldrin having the endo,endo configuration. Dieldrin is the name of a product consisting essentially of the 6,7-epoxy derivative of aldrin, and endrin is the name of a product consisting essentially of the endo,endo isomer of dieldrin. These insecticides have been found to rapidly lose their insecticidal potency when applied to sorptive surfaces.

It has now been discovered that the deactivation of residues of halogenated polycylic insecticides such as dieldrin, endrin, isodrin, and aldrin, when applied to the surfaces of materials with sorptive properties can be substantially inhibited if the insecticidal substance is in the form of a solid solution. The attraction for the molecules of insecticidal substance exerted by the solid solvent is greater than that exerted by the sorptive material. The insecticidal substance is consequently held on the surface of the treated material, where it continues to exert its residual toxicity rather than being lost in the interior of the material.

This discovery is of the greatest importance when considered with reference to the campaign to eliminate malaria carrying mosquitos in tropical areas. This campaign aims at breaking the chain of malaria transmission by spraying dwelling houses in malarial zones with insecticide. In order to break this chain of transmission, however, the active insecticidal agent must remain active for an extended period of time. Though the halogenated polycyclic insecticides such as dieldrin evidence residual toxicity, under ordinary circumstances they have been found inadequate when applied alone to the walls of mud huts in these tropical areas. The discovery that the solid solutions of the present invention maintain residual insecticidal toxicity for very extended periods of time, even when applied to highly sorptive mud surfaces consequently fills an urgent need in an altogether unique yet highly efficient manner.

The solid solvents used in the compositions of this invention are resins, both naturally occurring and synthetic. Among the naturally occurring resins the invention includes but is not restricted to colophony, wood resins obtained by solvent extraction of the tree stumps and branches, copal, dammar, shellac and kauri. Solid solutions of synthetic resins are broadly encompassed by the present invention. Illustrative of synthetic resins are the coumarone resins such as coumarone indene; resins from acetylene such as monovinylacetylene and divinylacetylene; petroleum resins such as those sold under the name "Caterex"; polystyrene and related resins; phenolic resins such as the phenol-aldehydes; alkyd and modified alkyd resins; polyvinyl esters, alcohols and acetals; the epoxy resins; and polyisocyanate resins. Solid chlorinated polyphenyls such as the Aroclors have been found very acceptable in solid solutions of the present invention.

Intimate contact between insecticidal substance and resin may generally be effected by grinding the two components together or by grinding them separately and then mixing the powders together. The contact between the insecticidal substance and the resin is considerably improved, however, if a solution of the two components in an organic solvent is evaporated to dryness. The solid residue thus obtained may then be powdered.

Outstanding improvement in residual toxicity is obtained when a solid solution of insecticide and resin is made by bringing the two components into intimate contact in a homogeneous molten mixture. This may be accomplished by mixing the solid components and heating and stirring the mixture until a homogeneous liquid is obtained. Alternatively, one of the components may be melted and the other solid component then added, with stirring and heating if necessary, until a homogeneous melt is obtained. The two components may also be separately melted and the liquids then mixed. The solid solvent used in this fusion process should have a softening point in the range of 50° to 250° C. The essence of this fusion is the intimate mixture of the components while in a homogeneous state.

The homogeneous molten mixtures thus obtained may then be allowed to cool en masse and the solidified melt converted into particulate form by one of the numerous well known means such as crushing in a hammer mill or in an air jet mill. Any difficulty in grinding due to slight tackiness of the solidified melt may be mitigated either by adding an inert particulate filler of the type used in compounding agricultural dusts to the molten mixture before it is allowed to cool or by adding such a filler to the solidified melt during grinding. The molten mixture of insecticidal substance and amorphous solid may also be sprayed or atomized into an inert gaseous medium such as air, or into a liquid with which it is immiscible, such as water, or onto a solid carrier, preferably in powder form. The ratio of insecticide to resin may vary greatly without departing from the scope of the invention. Thus a range of insecticide to resin of from 1:10 to 10:1 is within the scope of this invention. A range of insecticide to resin of from 1:2 to 2:1 is preferred, however.

The solid solutions of insecticide and resin thus formed are vastly superior to the compositions made by grinding or by evaporation from an organic solvent and constitute the preferred compositions of this invention. The present invention encompasses both saturated, super saturated and unsaturated mutual solid solutions.

The particulate solid mixture of insecticidal substance and solid solvent may be utilized as a dust, preferably after dilution with an inert powder filler of the type generally employed in the manufacture of dusts for the agricultural and horticultural industries. Attaclay or a highly absorbent carrier such as Hi-Sil 233, a synthetic precipitated hydrated silicon dioxide may be employed. The invention is not limited to these specific diluents however. Thus among the many diluents and carriers which may be successfully employed for the purposes of the present invention are the diatomites such as diatomaceous earth, calcium limes, calcites, dolomites, gypsum, mica, talc, pyrophylites, members of the montmorillonoid group such as bentonite, kaolinites, and attapulgites as well as other naturally occurring and synthetic diluents and carriers.

Preferably the particulate solid mixture is formulated as a wettable powder by incorporating a minor proportion of a surface active agent, for example the sodium salts of secondary alkyl sulfuric acid esters available under the registered trademark "Teepol," a non-ionic emulsifier such as the alkyl aryl polyether alcohol sold as Triton X–100 (registered trademark) or a deflocculating agent, i.e. a substance having definite deflocculating or dispersing properties as distinct from wetting properties, although wetting properties may also be present to a minor degree. Suitable deflocculating agents are, for example, certain commercially available products such as Pinex sulfite lye, Goulac, Leukanol, Intraphore and Tamol. Goulac is a lignin pitch, Leukanol is a condensed sulfonic acid dispersing agent, and Tamol is a sodium salt of condensed aryl sulfonic acid. If necessary, both a surface active agent and a deflocculating agent may be incorporated. Inert powder fillers and water conditioning agents such as sodium polyphosphates may also be incorporated. The solid solvent used in the above wettable powder formulations should, of course, be substantially insoluble in water.

The compositions of the invention may also contain substances such as urea and hexamethylene tetramine which stabilize the insecticidal component against decomposition when in contact with materials of an acidic nature. Other biologically active substances, such as other insecticidal compounds and acaricidal and bactericidal compounds may also be incorporated if desired.

The following examples illustrate the compositions of the invention and the improvement in residual toxicity obtained when these compositions are applied to panels made of laterite mud.

EXAMPLE I

Dieldrin was melted with equal weights of coumarone resin, Aroclor 5460, chlorinated polyphenyl compound, colophony, and sulfur, respectively, to form homogeneous solutions. The solid products obtained on cooling were mixed with 5 percent by weight of "Teepol" and ground to particles of sizes from 10 to 50 microns. The resulting powders were suspended in water and sprayed on dry panels of laterite mud, approximately one half inch thick, at the rate of 25 milligrams of dieldrin per square foot. The panels were stored under dry conditions at about 30° C. and the toxicity of the spray residues tested at intervals by allowing house flies (*Musca domestica*) to be in contact with them for 30 seconds and then determining the percentage knockdown at hourly intervals and the mortality of the flies 24 hours after contact with the spray residue. Comparative tests were carried out with a commercial dieldrin 50% wettable powder diluted with water and applied at the same rate to similar laterite mud panels. Similar tests were carried out with a commercial aldrin wettable powder for comparison and an aqueous suspension of a solidified molten mixture of aldrin and an equal weight of coumarone resin, applied at the rate of 25 milligrams of aldrin per square foot.

The results of these tests are summarized in Table I.

*Table I*

[Percentage knockdown and 24-hour mortality of *Musca domestica* after 30 seconds' exposure to dieldrin residues (25 mg./sq. ft. on mud panels)]

| Formulation | Age of Residue | Number of Hours After Exposure | | | | | | |
|---|---|---|---|---|---|---|---|---|
| | | 1½ | 2 | 3 | 4 | 5 | 6 | 24 |
| dieldrin (50% wettable powder) | 1 hour | 92 | 99 | 100 | | | | 100 |
| | 1 day | | | 0 | 4 | 11 | | 96 |
| | 1 week | | | | | 0 | 0 | 5 |
| Do | 2 hours | 4 | 4 | 36 | | | | 100 |
| | 3 days | 0 | 0 | 0 | 0 | 0 | 0 | 61 |
| | 2 weeks | 0 | 0 | 0 | 0 | 0 | 0 | 5 |
| | 1 month | 0 | 0 | 0 | 0 | 0 | 0 | 0 |
| dieldrin [2]/coumarone resin (50:50) | 2 hours | 49 | 85 | 95 | 100 | | | 100 |
| | 1 week | 0 | 12 | 59 | 94 | 100 | | 100 |
| | 2 weeks | 17 | 72 | 97 | 100 | | | 100 |
| | 4 weeks | 14 | 45 | 89 | 100 | | | 100 |
| | 6 weeks [1] | 7 | 7 | 26 | 56 | 67 | 89 | 100 |
| | 10 weeks [1] | 11 | 22 | 44 | 78 | 87 | 98 | 100 |
| Do.[2] | 2 hours | 4 | 15 | 89 | 96 | 100 | | 100 |
| | 1 week | 0 | 13 | 73 | 83 | 100 | | 100 |
| | 2 weeks | 9 | 9 | 16 | 47 | 69 | 91 | 100 |
| | 1 month | 3 | 14 | 43 | 69 | 74 | 91 | 100 |
| | 2 months | 10 | 43 | 73 | 93 | 98 | 98 | 98 |
| Do | 2 hours | 0 | 6 | 38 | | | | 100 |
| | 3 days | 6 | 30 | 79 | 91 | 97 | 100 | 100 |
| | 2 weeks | 0 | 6 | 45 | 77 | 87 | 100 | 100 |
| | 1 month | 5 | 18 | 76 | 95 | 100 | | 100 |
| | 2 months | 0 | 8 | 67 | 72 | 87 | 100 | 100 |
| Do | 2 hours | 38 | 57 | 100 | | | | 100 |
| | 2 weeks | 26 | 63 | 100 | | | | 100 |
| | 1 month | 40 | 64 | 88 | 100 | | | 100 |
| dieldrin/chlorinated polyphenyl (Aroclor 5460) (50:50) | 2 hours | 0 | 9 | 52 | 65 | 87 | | 100 |
| | 1 week | 20 | 67 | 100 | | | | 100 |
| | 2 weeks | 0 | 10 | 55 | 90 | 100 | | 100 |
| | 1 month | 71 | 83 | 100 | | | | 100 |
| | 2 months | 25 | 63 | 94 | 100 | | | 100 |
| dieldrin/colophony (50:50) | 2 hours | 0 | 15 | 42 | 46 | 58 | | 100 |
| | 1 week | 0 | 0 | 36 | 59 | 77 | 86 | 100 |
| | 2 weeks | 0 | 7 | 11 | 27 | 44 | 69 | 100 |
| | 1 month | 0 | 0 | 30 | 49 | 64 | 70 | 100 |
| | 2 months | 0 | 0 | 21 | 60 | 75 | 81 | 100 |
| dieldrin/sulfur (50:50) | 2 hours | 0 | 4 | 31 | 42 | 62 | | 100 |
| | 1 week | 0 | 14 | 71 | 100 | | | 100 |
| | 2 weeks | 3 | 9 | 69 | 91 | 97 | 97 | 100 |
| | 1 month | 0 | 4 | 36 | 68 | 75 | 82 | 100 |
| | 2 months | 0 | 12 | 42 | 63 | 77 | 88 | 100 |
| aldrin (50% wettable powder) | 2 hours | 0 | 0 | 31 | | | | 100 |
| | 3 days | 0 | 0 | 0 | | | | 8 |
| | 1 week | 0 | 0 | 0 | 0 | 0 | 0 | 0 |
| | 2 weeks | 0 | 0 | 0 | 0 | 0 | 0 | 0 |
| | 1 month | 0 | 0 | 0 | 0 | 0 | 0 | 0 |

See footnotes at end of table.

Table I—Continued

[Percentage knockdown and 24-hour mortality of *Musca domestica* after 30 seconds' exposure to dieldrin residues (25 mg./sq. ft. on mud panels)]

| Formulation | Age of Residue | Number of Hours After Exposure | | | | | | |
|---|---|---|---|---|---|---|---|---|
| | | 1½ | 2 | 3 | 4 | 5 | 6 | 24 |
| aldrin/coumarone resin (50:50). | 2 hours | 0 | 0 | 3 | | | | 94 |
| | 3 days | 0 | 0 | 0 | 0 | 0 | 0 | 65 |
| | 1 week | 0 | 0 | 0 | 0 | 0 | 0 | 79 |
| | 2 weeks | 0 | 0 | 0 | 0 | 0 | 0 | 61 |
| | 1 month | 0 | 0 | 0 | 0 | 0 | 0 | 28 |

Mortality in the controls was 3% or less.
[1] Residues tested for the second time.
[2] Dieldrin dosage 12.5 milligrams per square foot.

It is readily apparent that the deposits from the commercially available dieldrin and aldrin wettable powders are rapidly deactivated. The compositions of the invention, however, retain their activity for considerably longer periods. Thus, compositions containing dieldrin as the toxicant are still producing 100% mortality of the flies within 24 hours after exposure to a spray residue which was 10 weeks old. Aldrin alone causes only 8% mortality after 3 days while the solidified molten mixture of aldrin and coumarone resin causes 65% mortality 3 days after spraying, 61% mortality 2 weeks after spraying and 28% mortality one month after spraying. Similar tests with isodrin and endrin also evidenced the superior residual toxicity of these resin compositions to the insecticide when used alone.

EXAMPLE II

Dieldrin, aldrin, isodrin and endrin were each melted in various proportions with coumarone resin and the solid products obtained on cooling were formulated as wettable powders and tested as described in Example I. The results of the tests showing the dieldrin and coumarone resin composition are summarized in Table II.

Table II

[Percentage knockdown and 24-hour mortality of *Musca domestica* after 30 seconds' exposure to residues of dieldrin/coumarone resin (25 mg. dieldrin/ sq. ft.) at various ratios on mud panels]

| Formulation | Age of Residue | Number of Hours after Exposure | | | | | | |
|---|---|---|---|---|---|---|---|---|
| | | 1½ | 2 | 3 | 4 | 5 | 6 | 24 |
| dieldrin/coumarone resin 90:10. | 2 hours | 40 | 63 | 100 | | | | 100 |
| | 2 weeks | 0 | 0 | 10 | 33 | 49 | 67 | 100 |
| | 1 month | 0 | 11 | 44 | 76 | 85 | 89 | 100 |
| dieldrin/coumarone resin 70:30. | 2 hours | 14 | 17 | 48 | 59 | 83 | 93 | 100 |
| | 2 weeks | 0 | 0 | 5 | 35 | 62 | 78 | 100 |
| | 1 month | 0 | 11 | 40 | 69 | 82 | 93 | 100 |
| dieldrin/coumarone resin 30:70. | 2 hours | 0 | 8 | 38 | 50 | 60 | 75 | 100 |
| | 2 weeks | 0 | 0 | 0 | 0 | 8 | 13 | 100 |
| | 1 month | 0 | 2 | 21 | 52 | 65 | 71 | 100 |

There was no mortality in the controls.

It can be seen that although the formulations containing a high dieldrin to resin ratio initially cause a higher mortality than those in which the dieldrin to resin ratio is low, after 24 hours 100% mortality is obtained in all cases.

EXAMPLE III

Wettable powders each containing 50 percent by weight of dieldrin, aldrin, isodrin or endrin were prepared (a) by mixing the powdered insecticide and powdered coumarone resin, (b) by dissolving the insecticide and coumarone resin in acetone, evaporating the solvent and grinding the cooled mixture, (c) by grinding a solidified molten mixture of the insecticide and coumarone resin. To the resulting products, 5 percent by weight of "Teepol" was added. Aqueous suspensions of these formulations were then sprayed on mud panels at a dosage of 25 milligrams of dieldrin per square foot and the residual toxicity determined at intervals after spraying. The results obtained with a commercial 50% dieldrin wettable powder are included for comparison. The results of the tests employing dieldrin resin compositions are summarized in Table III.

Table III

[Percentage knockdown and 24-hour mortality of *Musca domestica* after 30 seconds' exposure to residues of different dieldrin coumarone resin combinations (25 mg. dieldrin/sq. ft.) on mud panels]

| Formulation | Age of Residue | Number of Hours after Exposure | | | | | | |
|---|---|---|---|---|---|---|---|---|
| | | 1½ | 2 | 3 | 4 | 5 | 6 | 24 |
| dieldrin (50% wettable powder). | 2 hours | 4 | 4 | 36 | | | | 100 |
| | 3 days | 0 | 0 | 0 | 0 | 0 | 0 | 61 |
| | 2 weeks | 0 | 0 | 0 | 0 | 0 | 0 | 5 |
| | 1 month | 0 | 0 | 0 | 0 | 0 | 0 | 0 |
| dieldrin/coumarone resin mixed (50:50) milled together. | 2 hours | 4 | 20 | 60 | | | | 100 |
| | 3 days | 0 | 0 | 20 | 47 | 57 | 60 | 100 |
| | 2 weeks | 0 | 0 | 0 | 0 | 0 | 16 | 68 |
| | 1 month | 0 | 0 | 4 | 35 | 71 | 78 | 100 |
| | 2 months | 0 | 0 | 0 | 0 | 10 | 27 | 87 |
| dieldrin/coumarone resin dissolved (50:50). | 2 hours | 0 | 0 | 13 | | | | 100 |
| | 3 days | 0 | 0 | 26 | 45 | 55 | 58 | 100 |
| | 2 weeks | 0 | 0 | 0 | 0 | 6 | 36 | 94 |
| | 1 month | 0 | 0 | 28 | 81 | 91 | 97 | 100 |
| | 2 months | 0 | 0 | 0 | 3 | 14 | 31 | 100 |
| dieldrin/coumarone resin melted (50:50). | 2 hours | 0 | 6 | 33 | | | | 100 |
| | 3 days | 6 | 30 | 79 | 91 | 97 | 100 | 100 |
| | 2 weeks | 0 | 6 | 45 | 77 | 87 | 100 | 100 |
| | 1 month | 5 | 18 | 76 | 95 | 100 | | 100 |
| | 2 months | 0 | 8 | 67 | 72 | 87 | 100 | 100 |

Mortality in the controls was 2% or less.

It can be seen that although good results were obtained in each case, the product obtained by melting the two components together was superior to the other formulations.

EXAMPLE IV

A 2:1 dieldrin-coumarone sample was prepared as follows: 4 g. of 2:1 dieldrin-coumarone indene mixture was melted in an oil bath, mixed well and cooled quickly with Dry Ice. The solid was then ground in a mortar with Dry Ice and the wetting suspending agents, Duponol ME Dry and Marasperse N. Duponol ME Dry is a fatty alcohol sulfate, Marasperse N is a salt of lignin sulfonic acid. All of the ground material was suspended in 200 ml. of water containing 0.25% Marasperse N. The composition evidenced excellent residual toxicity activity when applied to mud panels.

EXAMPLE V

A 2:1 dieldrin-coumarone sample was prepared as follows: 4 g. of 2:1 dieldrin-coumarone indene mixture was melted in an oil bath, mixed well and cooled gradually by allowing to stand at room temperature after the addition of suspending agents. All of the ground material was suspended in 200 ml. of water containing 0.25% Marasperse N. The composition evidenced excellent residual activity when applied to mud panels.

EXAMPLE VI

Various formulations were made employing 50% by weight dieldrin, 25% by weight resin, 6.0% by weight Marasperse CB, 1.0% by weight Duponol ME Dry, and 18% by weight Attaclay (containing 5% urea). All formulations were prepared from a 2:1 dieldrin-resin melt which was quick-cooled, cut back with surfactants and Attaclay and hammer- and air-milled. Tests were conducted on formulations containing each of the following resins.

| Name and Supplier | Type | MP or SP, ° C. |
|---|---|---|
| Ester Gum No. 1200, Reichold Chem. Co. | Pure gum resin ester | 65–72 |
| Beckacite No. 1116, Reichold Chem. Co. | Modified phenol resins | 132–154 |
| Coumarone R-12A, Neville Co. | Coumarone-indene resin | 108–117 |
| Neville LX-782 Neville Co. | Oxidizing Resin | 98–110 |
| Nebony 100, Neville Co. | Hydrocarbon resin | 96–10 |
| Copal Chips, Scheel Co. | Natural resin | 120–126 |

| Name and Supplier | Type | MP or SP, °C. |
|---|---|---|
| Batu Bold Scraped Gum Damar, Scheel Co. | ----do---- | 168-180 |
| Red Yacca Gum, Scheel Co. | ----do---- | 110-128 |
| Pentalyn N, Hercules Powder Co. | Pentaerythritol ester of rosin—low acid number. | 110-119 |
| Pentalyn K, Hercules Powder Co. | Pentaerythritol ester of rosin. | 189-197 |
| Vinsol Ester Gum, Hercules Powder Co. | Glycerol ester of vinsol | 140-155 |
| Pentalyn A, Hercules Powder Co. | Pentaerythritol ester of rosin. | 109-116 |
| SL Ester Gum, Hercules Powder Co. | Glycerol ester of pale wood rosin. | 89-96 |
| Synthe Copal Ester Gum, Reichold Chem. Co. | | |
| Lewisol 33, Hercules Powder Co. | Maleic alkyd modified rosin ester. | 115-165 |
| Cellolyn 102, Hercules Powder Co. | Modified pentaerythritol ester of rosin. | 132-140 |
| Poly-Pale Ester 10, Hercules Powder Co. | Glycerol ester of polymerized rosin. | 109-119 |
| Piccolyte S-125, Penna. Inc. Chem. Corp. | Hydrocarbon terpene resin | 125 |
| Piccolastic D-150, Penna. Inc. Chem. Corp. | Polymer of styrene | 145 |
| Piccopale 100, Penna. Inc. Chem. Corp. | Polymerized unsaturates derived from deep cracking of petroleum. | 97-103 |
| Nebony 80, Neville Co. | Hydrocarbon - dark - colored thermoplastic resin. | 98-106 |
| Nevidene (R-6), Neville Co. | Coumarone-indene | 126 |
| Neville Resin (R-16A), Neville Co. | ----do---- | 65-85 |
| Paradene No. 1, Neville Co. | ----do---- | 65-85 |
| Paradene No. 2, Neville Co. | ----do---- | 86-100 |
| Nuba No. 2, Neville Co. | Dark thermoplastic resinous pitches. | 86-105 |
| Aroclor 5460, Monsanto Chem. Co. | Chlorinated terphenyl | |
| Flash Cracked Asphalt, Shell Development Co. | Petroleum resin | 89 |
| Do | ----do---- | 173 |
| Kerr Mac Resins, Kerr-McGee Oil Co. | ----do---- | 155 |
| Lube Crude Asphalt, Shell Development Co. | ----do---- | |
| Neville Chlorinated Resin, Neville Co. | Chlorinated hydrocarbon | |
| Chlorowax 705, Diamond Alkali Corp. | Chlorinated paraffins | 100 |
| Alkydol 105, Alkydol Laboratories Inc. | Polymerized rosin ester | 100-105 |

These compositions evidenced excellent residual activity when applied to mud panels.

It will be understood that although the examples show specific quantities and types of insecticidal compounds and resins, the invention is not to be construed as limited except by the hereto appended claims.

Having thus described this invention in full what is desired to be protected by United States Letters Patent is:

1. An insecticidal composition comprising a solid solution of an insecticide and a solid resin, the weight ratio of said insecticide to said resin lying within the range of from about 9:1 to about 3:7, the insecticide being selected from the group consisting of 1,2,3,4,10,10-hexachloro-1,4,4a,5,8,8a-hexahydro-1,4,5,8 - endo - exo - dimethanonaphthalene, 1,2,3,4,10,10-hexachloro-1,4,4a,5,8,8a-hexahydro-1,4,5,8-endo - endo - dimethanonaphthalene, 1,2,3,4,10,10-hexachloro-6,7-epoxy-1,4,4a,5,6,7,8,8a - octahydro-1,4,5,8-endo-exo-dimethanonaphthalene and 1,2,3,4,10,10-hexachloro-6,7-epoxy-1,4,4a,5,6,7,8,8a - octahydro - 1,4,5,8-endo-endo-dimethanonaphthalene, and the resin being selected from the group consisting of colophony, copal, wood resins, dammar resin, shellac, kauri resin, coumarone resins, mono- and poly-vinylacetylene resins, petroleum resins, styrene resins, phenol-aldehyde resins, alkyd resins, polyvinyl ester resins, polyvinyl alcohol resins, polyvinyl acetal resins, epoxy resins, polyisocyanate resins, chlorinated polyphenyl resins, sulfur, gum resin esters, rosin ester resins, hydrocarbon terpene resins, and chlorinated paraffin resins.

2. An insecticidal composition comprising a solid solution of an insecticide and a coumarone-indene resin, the weight ratio of said insecticide to said resin lying within the range of from 9:1 to 3:7, the insecticide being selected from the group consisting of 1,2,3,4,10,10-hexachloro-1,4,4a,5,8,8a-hexahydro-1,4,5,8-endo-exo - dimethanonaphthalene, 1,2,3,4,10,10-hexachloro-1,4,4a,5,8,8a-hexahydro-1,4,5,8-endo-endo - dimethanonaphthalene, 1,2,3,4,10,10-hexachloro-6,7-epoxy-1,4,4a,5,6,7,8,8a-octahydro - 1,4,5,8-endo-exo-dimethanonaphthalene and 1,2,3,4,10,10-hexachloro-6,7 - epoxy - 1,4,4a,5,6,7,8,8a - octahydro - 1,4,5,8-endo-endo-dimethanonaphthalene.

References Cited in the file of this patent

UNITED STATES PATENTS

| 2,497,294 | Cartwright | Feb. 14, 1950 |
| 2,525,155 | Thynne et al. | Oct. 10, 1950 |

FOREIGN PATENTS

| 132,783 | Australia | May 24, 1949 |
| 599,237 | Great Britain | Mar. 8, 1948 |
| 680,517 | Great Britain | Oct. 8, 1952 |
| 709,721 | Great Britain | June 2, 1954 |

OTHER REFERENCES

Mfg. Chemist, May 1956, pp. 190 and 191.

"Handbook of Aldrin, Dieldrin and Endrin," Shell Chem. Corp., December 1954.